Nov. 22, 1927.
L. WILLIS
POTATO HARVESTER
Filed July 29, 1926
1,650,562
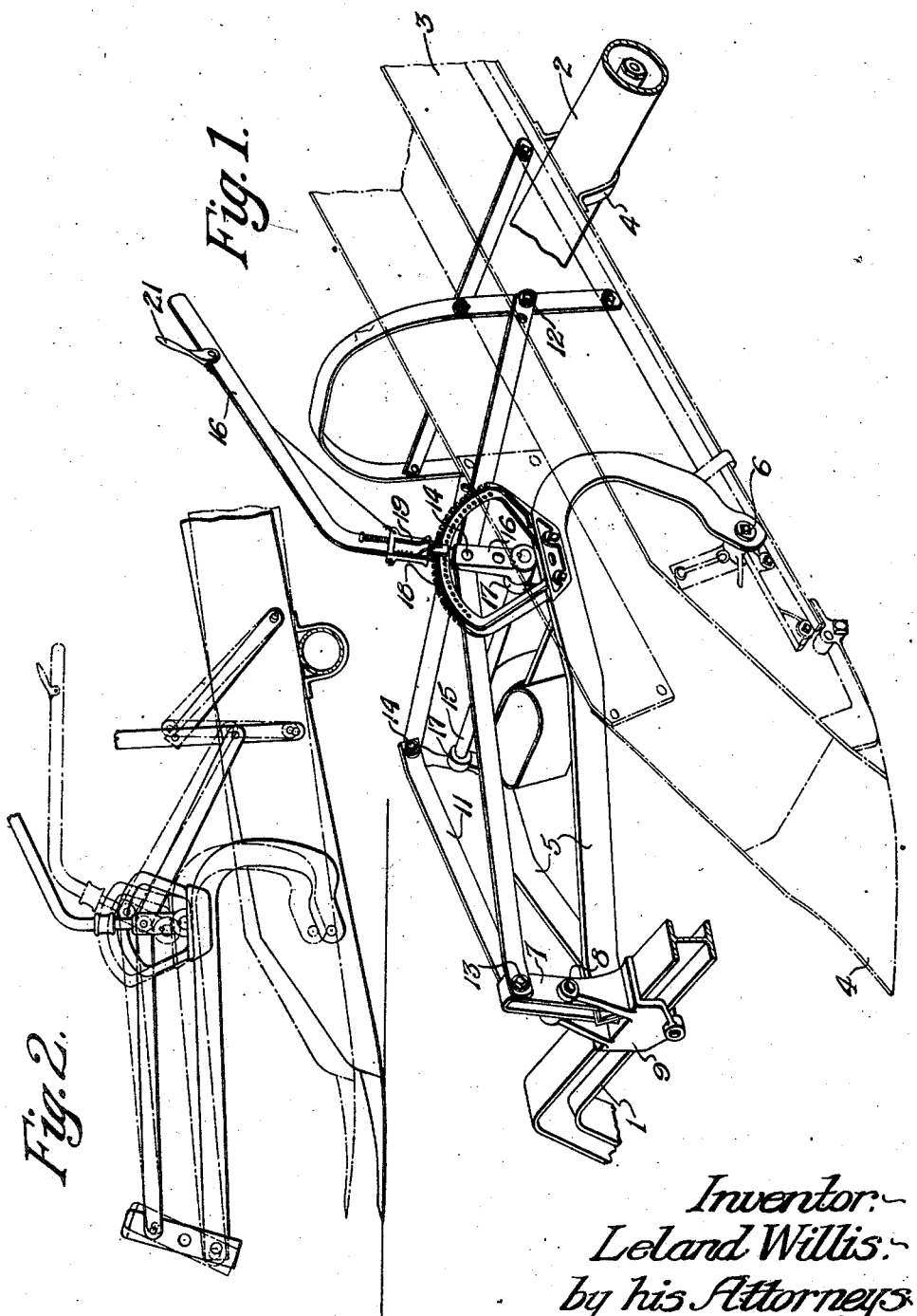
Inventor:-
Leland Willis:-
by his Attorneys
Howson & Howson Patented Nov. 22, 1927.

1,650,562

UNITED STATES PATENT OFFICE.

LELAND WILLIS, OF PITMAN, NEW JERSEY, ASSIGNOR TO FRED H. BATEMAN CO., OF PHILADELPHIA, PENNSYLVANIA, A CORPORATION OF NEW JERSEY.

POTATO HARVESTER.

Application filed July 29, 1926. Serial No. 125,726.

This invention relates primarily to a novel form of linkage whereby two members, relatively movable about a more or less fixed axis, may be adjusted to and held rigidly in predetermined relation as regards said angular movement.

In a particular application, the invention relates to potato harvesting devices of the class including a wheeled truck or tractor upon which is mounted a scoop structure including an endless conveyer for carrying the potatoes, after removal from the ground, to a desired point or container.

The forward or operating end of this scoop structure should be adjustable vertically, and the connection between the forward end of the scoop and the frame of the tractor must be rigid and at the same time permit said adjustment. Also the angular adjustment of the scoop structure must be such as not to disturb the operating connection between the motor of the tractor and the aforesaid endless conveyer. It is the principal object of the present invention, therefore, to provide a novel form of linkage which will afford a rigid but adjustable connection between the scoop structure and the frame of the machine and which shall also afford an angular adjustment of the scoop structure about an axis which is substantially fixed.

In the attached drawings:

Figure 1 is a view in perspective of the essential portions of a potato harvesting machine made in accordance with the present invention, and Fig. 2 is a diagrammatic side elevation illustrating graphically the operation of the adjusting linkage.

Referring to the drawings, 1 indicates a part of the front axle of the machine, and 2 a bar which constitutes the fixed axis about which the scoop structure, illustrated in Fig. 1 in broken lines and designated by the reference numeral 3, is adjustable. This scoop structure has at its forward end a pointed element 4 which is adapted to enter the ground and to plow up the potatoes which enter the interior of the scoop and are conducted upwardly and rearwardly by means of an endless conveyer (not illustrated). The bar 2 upon which this scoop structure is supported may be, for example, the rear axle of the machine, and I have shown a strap 4 on the bottom of the scoop structure which passes around the shaft 2 and prevents longitudinal body movement of the scoop on the latter.

As will be apparent, the forward or digging end 4 of the scoop should be vertically adjustable so as to regulate the depth to which it penetrates the ground and to provide for its being elevated above the ground surface when the machine is to be transported from one point to another. In the present instance, the forward end of the structure 3 is supported by means of a special form of linkage which comprises in the present instance a link 5 consisting of two integral rods extending to opposite sides of the scoop structure and pivotally secured thereto, the pivot of the near rod being designated in the drawings by the reference numeral 6. The forward ends of these rods are pivotally secured to the lower end of a lever arm 7 which in turn is pivotally supported upon a horizontal axis 8 in a bracket 9 secured to the forward axle 1. The linkage further comprises a link 11 consisting of two articulated arms pivotally secured at their rear ends to the opposite sides of the scoop structure 3, as indicated at 12, and at their forward ends pivotally secured, at 13, to the upper end of the arm 7. Each of the links 11 consists of two rods in end to end relation and pivotally connected, as indicated at 14, so that relative movement of the links 5 and 11 is permitted by a corresponding pivotal movement of the arm 7 about the pivot 8 and a movement of the articulated links about the pivot 14. The arrangement is such that as shown in Fig. 2, the forward movement of the lower end of the arm 7 results in an elevation of the forward or working end 4 of the scoop structure 3 around its fixed axis on the shaft 2.

In order to effect this adjusting movement of the linkage, I provide a transverse shaft 15 between the rods which constitute the link 5, and at one end of this shaft I secure an arm 16, the arm being keyed to the shaft and the shaft being rotatable in bearings 17, 17 on the said link rods. The arm 16 is also pivotally connected at 14 to the link 11, or to one of the articulated rods which constitute this link, and the lever extends from this point upwardly and rearwardly to afford the leverage necessary for manual operation. By manipulating this lever as indicated in broken lines in Fig. 2, the scoop structure may be given its angular adjustment, as previously described. In order to retain the parts in the adjusted position, I provide a toothed segment 18 upon one of the rods of the link 5, and cooperating with this element a detent 19 adjustable into and out of engagement with the teeth of the segment 18 by means of a handle 21 upon the lever 16.

The operation of the device will be apparent, and is well illustrated in the drawings. In Fig. 2, for example, one position of the parts is shown in full lines, and the adjusted position of the same parts in broken lines. It will be noted that while affording a rigid connection between the frame piece 1 and the scoop structure 3 which insures a retention of the scoop structure in any desired adjusted position against the stresses and strains to which it is subjected in normal operation of the machine, the linkage provides also a simple and efficient means for adjusting the scoop around a substantially fixed axis whereby the aforesaid operating connection between the conveyer carried by the scoop structure and the operating parts of the tractor is not disturbed.

While I have described the device primarily in connection with a potato harvester, it will be understood that this adjustable linkage may be found useful in other machines and apparatus, and the invention is not limited to any particular application. It will also be noted that while the drawings illustrate the scoop structure as movable about a fixed axis, the invention is not to be limited to a strictly fixed axis, since a slight longitudinal bodily movement of the scoop structure, not sufficient to disrupt or seriously interfere with the operative connection between the aforesaid conveyer and the operating parts of the tractor, would not be objectionable.

I claim:

1. The combination of a frame, a scoop mounted for angular adjustment in the frame, a lever pivoted to the frame, links extending between the lever at opposite sides of the pivot and the said scoop, and means for relatively moving the links to effect said angular adjustment of the scoop.

2. The combination of a frame, a scoop mounted for angular adjustment in the frame, a lever pivoted to the frame, an integral link extending between the scoop and one end of the lever, an articulated link extending between the scoop and the other end of the lever, an arm pivotally connected with both links, and means for locking the arm in adjusted position.

LELAND WILLIS.